3,040,288
MEANS FOR CONNECTING METAL JACKETED
COAXIAL CABLE
George G. Edlen and Leo George Dumire, Silver Spring, Md., assignors, by mesne assignments, to Phelps Dodge Copper Products Corporation, New York, N.Y., a corporation of Delaware
Filed Feb. 27, 1958, Ser. No. 717,898
8 Claims. (Cl. 339—103)

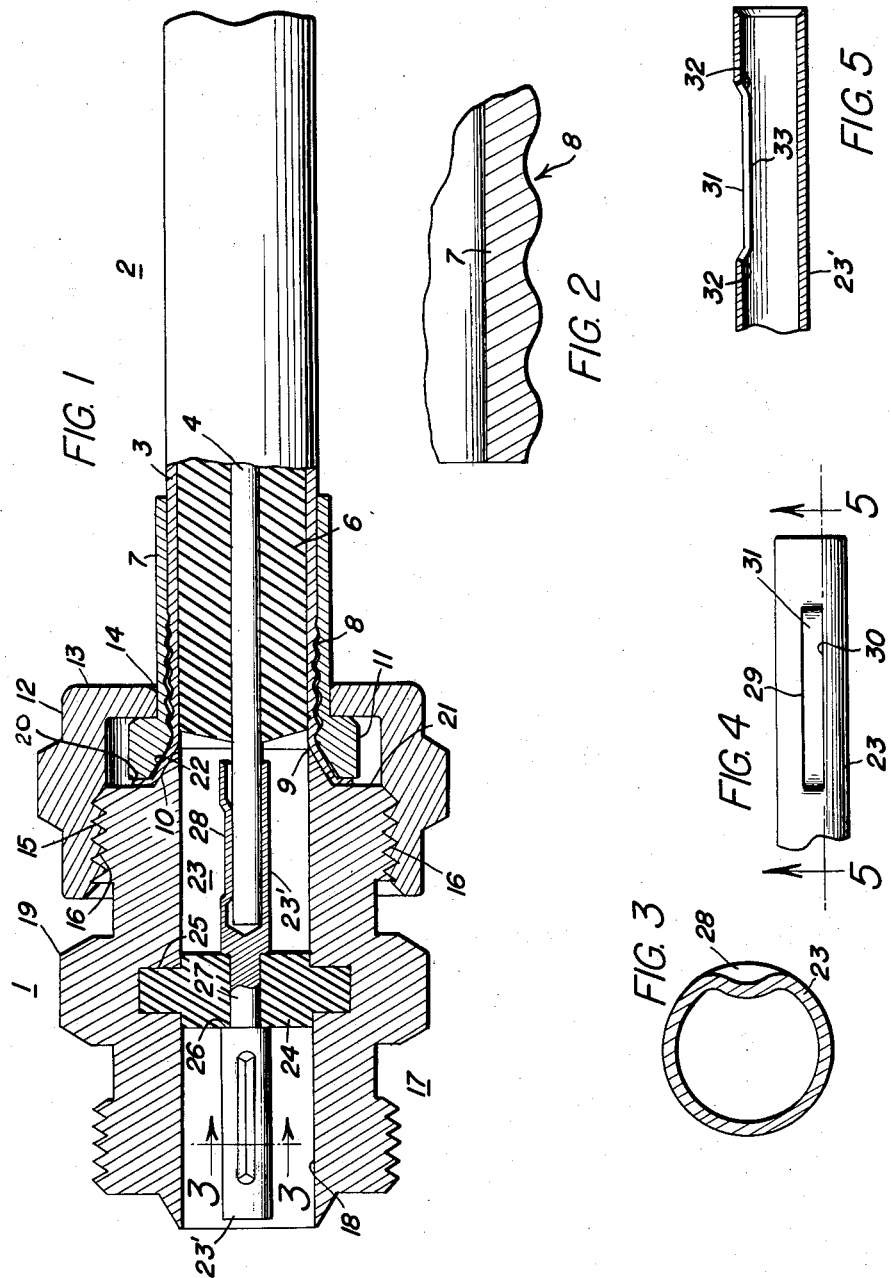

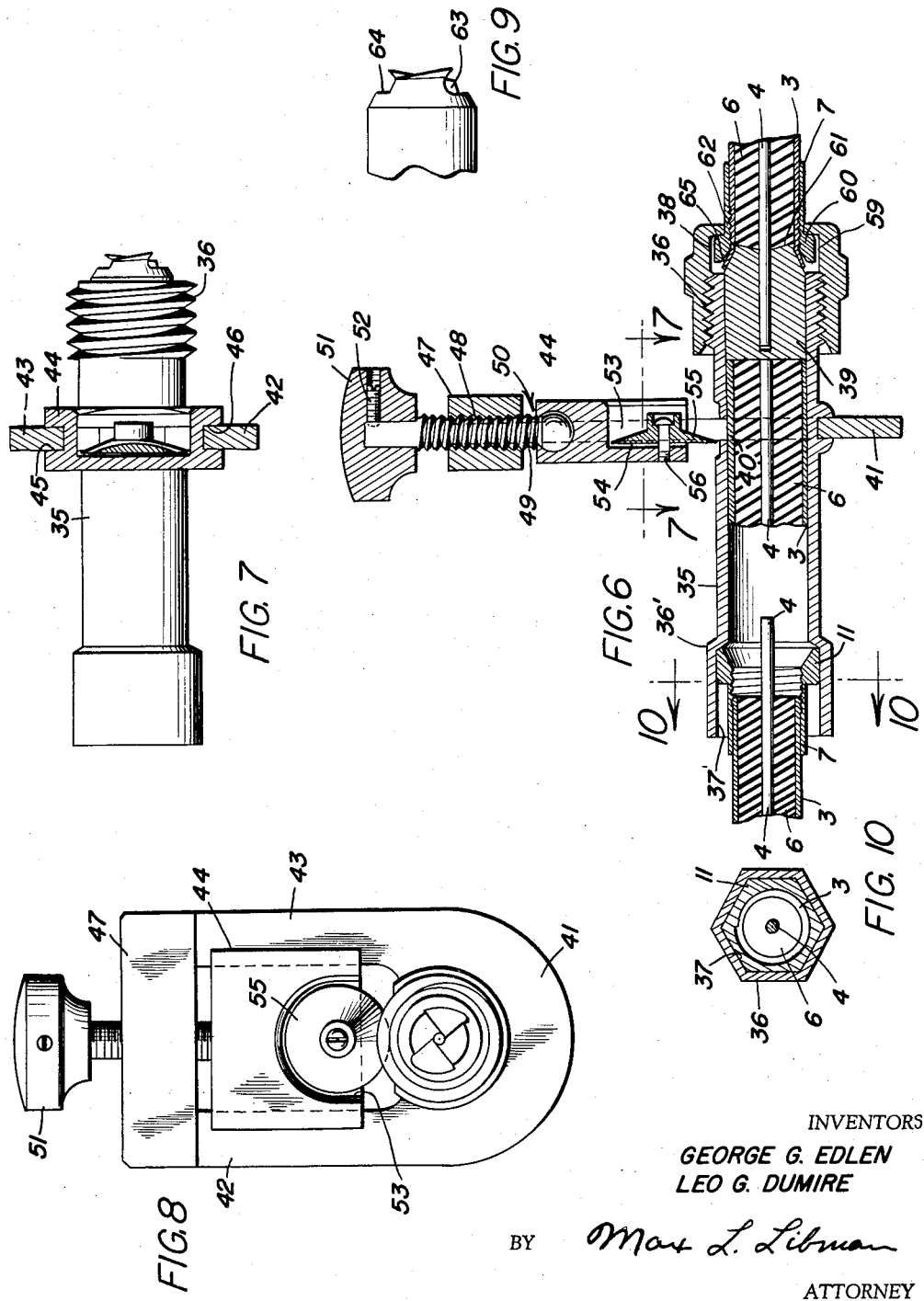

The present invention relates to coaxial cable connectors and more particular to a coaxial cable connector for aluminum jacketed coaxial cables and to a tool for applying the connector to a cable.

Considerable difficulty has been experienced in developing a coaxial cable connector for aluminum jacketed coaxial cables. More particularly, difficulty has been experienced in securing the connector to the cable with sufficient strength that the connector will not be pulled from the cable under loads which are experienced in actual field operations. Prior experience with affixing connectors to metallic tubes has indicated two approaches may be employed. In a first approach a nut is placed over the end of the tube and the end of the tube is then flared so that when the nut is coupled to the body of the connector, the flare cooperates with an inwardly directed flange on the nut to provide a secure coupling between the tube and the connection. It was found however that when this approach was employed in attaching connector to aluminum jacketed cables, the tube was weakened at the junction of the tube and the flare to such an extent that the flared portion became easily detached from the remainder of the tube and therefore this method was found to be completely unsuitable.

A second approach to securing couplers to metallic tubes has been to thread the tube and the coupler so as to provide a threaded connection therebetween. This method was also found to be unsuitable because the aluminum tubing was so weakened by the threads that when the assembly was subjected to a pull test, the aluminum jacket readily parted along the line of the thread.

An additional disadvantage accruing to the utilization of threads to secure the coupler to the cable is that the inner surface of the tube was deformed to such an extent that the resulting distortion produces a mismatch. Therefore, appreciable deformation of the inner surface of the outer conductor must be avoided.

An attempt was made to reduce the cutting and the deforming effect of the thread by making the threads shallower, but a thread depth was arrived at where the threads would not take in the sleeve before a depth was achieved which would not materially weaken the jacket or deform its interior. It appears that the initial threads started at the very end of the jacket were of insufficient strength to pull the cutting member along the length of the tube and the threads initially cut were torn out so that all that remained was a short end length of tube of reduced diameter. Therefore, it was found that neither of the conventional approaches, of flaring the ends of the tube or threading the tube, were applicable to aluminum jacketed coaxial cables.

Another difficulty with most methods for securing coaxial connectors to aluminum jacketed coaxial cables is the difficulty in applying the connectors and the requirement of a large number of different types of tools which must be employed for cutting the cable so as to leave a small end portion of the center conductor available for connection to the connector and for flaring the cable if the first method of attachment is employed or for threading the cable or applying a threaded sleeve to the cable if the second method is employed, are all distinct tools and normally are rather difficult to employ.

It is an object of the present invention to provide a coaxial cable connector for aluminum jacketed tubes which is secured to the aluminum jacketed cable with such strength that the coupling between the cable and the connector is stronger than the body of the cable itself.

It is another object of the present invention to provide a coaxial cable connector which is secured to the cable with such strength that under a pull test the body of the cable parts before the connector can be pulled from the cable.

It is another object of the present invention to provide a coaxial cable connector which may be readily connected to the cable in field work and further to provide a novel single tool for performing substantially all of the operations necessary for applying the connector to the cable.

It is yet another object of the present invention to provide a single tool which may perform substantially all of the operations required for securing the coaxial cable connector of the present invention to an aluminum jacketed coaxial cable.

In accordance with the present invention there is provided a coaxial cable connector consisting of three distinct parts, a metallic sleeve, a nut and a main connector body. The sleeve has an internal diameter of approximately the same diameter as the external diameter of the aluminum jacketed cable, and terminates at one end in an outwardly directed flange which for purposes to be described subsequently is formed as a many-sided nut. The inner diameter of the metallic sleeve is uniform throughout its length except at a portion adjacent the flange where the internal diameter gradually tapers outwardly from adjacent the axial, inner edge of a flange to the end of the flange. The inner circumference of the sleeve is threaded from adjacent the inner end of the tapered portion of the sleeve over a predetermined length. The connector further comprises a nut having an internal diameter substantially greater than the external diameter of the sleeve but having an inwardly directed flange adjacent an unthreaded end of the nut which cooperates with the nut-shaped flange on the sleeve so as to provide a stop for the nut, that is, to provide a surface of engagement with the radial surface of the flange.

The main body of the connector comprises a cylindrical member having thread at its two ends, with at least one set of these threads being adapted to cooperate with the threads on the nut which is disposed about the sleeve. The other set of threads may be adapted to cooperate with any desired type of prior art connector or a sleeve and nut of the connector of the present invention. The transverse annular end face of the main body of the connector, terminates in an axially-extending shoulder which tapers inwardly with a slope corresponding approximately with the slope of the outwardly flared portion of the sleeve. A small hollow tube is disposed coaxially of the main connector body and is secured therein by an appropriate dielectric material which is positioned remote from the two ends of the small hollow tube which ends coincide approximately with the ends of the connector body. The hollow tube is adapted to receive the center conductor of the coaxial cable.

Referring specifically to the novel features of the connector of the present invention, the hollow sleeve is adapted to be threaded onto the end of the aluminum jacket. A threaded coupling which neither weakens the jacket or produces appreciable deformation of the internal surface of the jacket has been achieved by employing rounded threads of lesser depth than standard (sharp) threads of sufficient depth to cut threads in the jacket. It has been found that round threads will emboss a track in the jacket, where sharp threads are of insufficient depth to so do and that the threads thus formed in the jacket do not weaken the jacket or produce appreciable deformation of the internal surface thereof.

Thus, the utilization of the rounded thread overcomes both difficulties experienced with the sharp threads of the prior art type connectors. An indication of the magnitude of the problem encountered in applying a thread to an aluminum jacketed cable may readily be seen when one considers that in one instance the thickness of the walls of the aluminum jacketed cable are approximately twenty-five thousandths of an inch and the peak-to-peak depth of the thread on the sleeve is only sixty-five ten-thousandths of an inch, a ratio of dimensions of approximately 3.9. The ratio of 3.9 has been found to be preferable but the ratio may be varied from 3.3 to 5.6 although at the lower limit the cable becomes somewhat weaker and deformed and at the upper limit the threads are difficult to cut and the coupling is somewhat weak.

The principles underlying the ability to thread a sleeve having a thread depth of only sixty-five ten-thousandths of an inch into an aluminum cable when a rounded thread is employed as opposed to the inability to accomplish this same threading action when a sharp thread is employed is not completely understood. It is believed, however, that the difference arises from the fact that the sharp thread attempts to cut and remove material from the aluminum jacket whereas the rounded thread appears to cause the material to flow into the dwells rather than displace it along the threads as they are cut. In order to insure that substantially all of the metal displaced by the thread may flow into the dwells, the mean diameter of the thread is chosen to be approximately the same as the outer diameter of the jacket, so that a volume subsists between the convolutions of the thread outwardly of the outer conductor equal to the volume of the material displaced by the thread.

In applying the coupler of the invention, the sleeve is threaded onto the aluminum jacket until the aluminum tube extends slightly beyond the flange end thereof, and is then flared towards engagement with the tapered inner diameter of the sleeve. It has been found that the cooperation between the tapered portion of the sleeve and the flared aluminum body, strengthens the connection between the sleeve and the jacket, the flare being insufficient to produce weakening of the metal. Further, a moisture-proof connection between the cable and the connector is achieved as a result of the fact that the aluminum is a relatively soft material which under the great pressure applied between the opposed portions of the connector when the nut is threaded onto the main body and drawn tight, provides a moisture-proof seal.

Yet another novel feature of the present invention is the structure of the small hollow tube which is adapted to engage the center conductor of the coaxial cable. In most coaxial cables the force required for maintaining the hollow tube in intimate contact with the center conductor of the coaxial cable is effected by imbedding the center hollow member in a body of resilient dielectric. Such a practice leads to distinct disadvantages in that an impedance match is very difficult to obtain with such a connector. Specifically, the impedance of the connector is determined by the relative diameters of the small hollow pin and of the cylindrical main body of the connector taken in conjunction with the dielectric constant of the material therebetween. When a material such as nylon or other solid dielectric material is employed which has a fairly high dielectric constant, the internal diameter of the main body of the connector must be considerably greater than where an air dielectric is employed. In accordance with this phase of the present invention, a hollow center pin is provided which securely grasps the center conductor of the coaxial cable without requiring additional external force from a resilient dielectric material. Specifically and in accordance with one embodiment of the invention, the hollow center conductor is deformed along an axial line to provide an inwardly directed portion when looking at the cross-section of the tube. The inwardly directed portion, however forms a continuous curve with the entire cylindrical body and it is this feature which assures the required resilient contact with the center conductor of the cable. Normally, when longitudinally-extending indentations are employed in hollow tubes for the purposes of retaining a piece therein, the crimped portions merge into the main body of the center pin along a discontinuous curve, that is at a sharp angle. In accordance with this embodiment of the invention it has been found that if the inwardly-directed longitudinally-extending portion forms a part from a continuous curve which merges into the main body of the hollow member, that is, it is curved into the main body, then sufficient resilience is imparted to this inwardly directed portion that it tightly engages and holds the center conductor of the cable not only upon its initial insertion but after repeated withdrawals and insertions and does not appear to lose any of its resilience over extended periods of use. Therefore, there is no requirement for filling the end of the connector with dielectric material and the internal diameter of the main body of the connector may be sufficiently small to provide impedance matching of the connector to the cable.

In the second embodiment of the center hollow conductor the spring-effect is provided by cutting the hollow conductor along two longitudinally-extending parallel lines and deforming the portion of the material subsisting between these two parallel lines inwardly. After the deformation or concurrently therewith the inwardly deformed material is work-hardened over a major portion of its length so that the overall length of the deformed portion is greater than that of the surrounding material. The portions immediately adjacent the ends of the two parallel lines, that is, where the cut portion merges into the main body are not hardened and remain resilient but since the overall length of this material has been permanently extended, it has been found that this spring substantially permanently retains its resilience and will hold a center conductor with a surprising amount of force over a number of insertions and withdrawals.

In connecting or applying the connector to the cable, the outer aluminum tube and the dielectric material are trimmed back from the edge of the cable by a predetermined amount so as to leave a bare center conductor for insertion into the central hollow pin of the main body of the connector. Thereafter, the nut is placed on the cable and the sleeve is threaded thereon. The outer aluminum jacket is then partially flared into the tapered portion of the sleeve and the main body of the connector is applied by inserting the center conductor into the hollow center pin of the connector and thereafter threading the nut into the main body of the connector. As the main body of the connector is drawn up by the nut, its axially outwardly-extending, radially inwardly-tapered portion completes the flare of the jacket and produces the moisture-proof seal as previously described.

Further in accordance with the present invention, there is provided a single tool which may be employed for performing all of the aforesaid operations except perhaps tightening the nut onto the main body of the connector. More specifically, the tool comprises a hollow body of approximately the same diameter as the outer diameter of the aluminum jacketed cable. Disposed inwardly of this hollow body is a wall having a predetermined displacement from a transverse slot formed in the body. A yoke is secured to the outer edge of the hollow body and is adapted to support a reciprocatable block to which is secured a rotatable circular knife adapted to extend through the transverse slot in the hollow body and into engagement with the jacket of the cable. The block is adapted to be reciprocated by a thumb screw arrangement which is threaded into a cross piece on the yoke and rotatably secured in the top of the block. After the cable has been inserted into the hollow portion of the tool and brought into abutting relation with the internal wall, the thumb screw is rotated until the rotatable circular blade contacts the aluminum jacket and the tool may then be rotated to provide an initial shallow cut. The blade is advanced and the tool rotated and this procedure is continued until the blade has been inserted a maximum depth which is slightly less than that required to bring the knife into engagement with the center conductor. After the blade has been inserted to its maximum depth, the cable is withdrawn and the cut portion of the cable twisted off with a pair of pliers leaving a short length of the center conductor exposed. An important feature of the rotatable knife blade is that the blade is perfectly flat along the transverse surface facing the main body of the cable while it tapers slightly outwardly along the surface adjacent the end of the cable. It has been found that with this construction a clean cut is produced on the severed end of the cable, and the burr is formed only on the short piece of metal jacket which is removed. The presence of an inwardly-extending burr at the end of the cable is obviously undesirable, but in this simple manner the problem is effectively disposed of.

Proceeding with the description of the tool, one end of the hollow body is provided with a wrench which mates with the nut-shaped flange formed on the end of the sleeve. The nut-shaped end of the sleeve may be inserted in the wrench end of the tool and the entire tool may be rotated so as to thread the sleeve onto the cable. The other end of the hollow body of the cutting tool is threaded so as to permit threading engagement with the nut which is disposed on the cable body. This end also is provided with an extension from the end face thereof which has a taper conforming with the taper of the outward extension of the main body of the connector. This tapered portion terminates in a two-blade cutter and centrally is provided with a hole of approximately the same diameter as the center conductor of the cable. When the cutter end of the tool is engaged by the nut of the connector and drawn up the two-blade cutter engages the dielectric material between the center and outer conductor of the cable so that upon the rotation of the tool the dielectric material is removed from between the center and outer conductors to a point immediately adjacent the inner end of the flared portion of the sleeve. Thus, the dielectric material is removed from that portion of the cable into which the tapered extension of the main body of the connector is to extend. The flared portion of the cutter tool is designed so that it only partially flares the end of the cable and the flaring is completed when the main body of the connector is drawn tight against the sleeve by rotation of the nut disposed on the sleeve, which also tends to rub off any oxide film on the abutting surfaces to produce a good metal-to-metal contact.

It may be seen that a single tool is provided in accordance with the present invention and for trimming away the outer conductor and dielectric material of the cable so as to provide a portion of the center conductor for insertion into the center conductor of the main body of the conductor. The same tool is employed for threading the sleeve onto the cable and is further employed for starting the initial flare in the end portion of the outer shield of the cable and for removing the dielectric material from that portion of the cable which is outwardly flared. The present invention, therefore, not only provides a novel co-axial cable connector but also provides a connector which may be readily applied by a novel tool arrangement so that the worker in the field is not unduly burdened by a large number of complex and expensive tools, the tool provided being relatively simple and inexpensive.

It is, therefore, another object of the present invention to provide a coaxial cable connector for aluminum jacketed cable which may be readily applied to the cable with a minimum of effort and by utilizing substantially only a single tool for the majority of the steps of the operation.

It is yet another object of the present invention to provide a coaxial cable connector for aluminum jacketed coaxial cables which employ shallow rounded threads for threading a metallic sleeve onto the aluminum jacketed cable which threads do not produce any substantial deformation of the internal diameter of the aluminum jacket or weakening of the jacket.

It is another object of the present invention to provide a coaxial cable connector having a hollow center pin for engaging the center conductor with the cable which pin is sufficiently resilient so as not to require a supporting resilient dielectric body to be disposed thereabout.

It is still another object of the present invention to provide a novel tool for utilization in applying a coaxial cable connector of the present invention to an aluminum jacketed coaxial cable which tool is employed to remove the outer conductor and dielectric of the cable which is employed to thread the sleeve onto the cable and which is employed to produce the initial flare in the end of the outer sleeve and to remove the dielectric material from adjacent the flared region of the outer conductor.

The above and still further objects, features and advantages of the present invention will become apparent upon consideration of the following detailed description of one specific embodiment thereof, especially when taken in conjunction with the accompanying drawings, wherein:

FIGURE 1 is an exploded cross-sectional view of the connector of the present invention;

FIGURE 2 is an enlarged cross-sectional view of the rounded threads employed;

FIGURE 3 is a cross-sectional view taken along line 2—2 of FIGURE 2;

FIGURE 4 is a view in elevation of an alternative embodiment of the center pin of the connector;

FIGURE 5 is a cross-sectional view taken along line 5—5 of FIGURE 4;

FIGURE 6 is a cross-sectional view in elevation of a novel tool for applying the connector of the invention to a co-axial cable;

FIGURE 7 is a cross-sectional view taken along line 7—7 of FIGURE 6;

FIGURE 8 is an end view in elevation of the tool;

FIGURE 9 is a side view of one of the cutters employed in the tool of the present invention; and FIGURE 10 is a cross-sectional view taken along line 10—10 of FIGURE 6.

Referring specifically to FIGURE 1 of the accompanying drawings, the connector of the present invention, generally designated by the reference numeral 1, is disclosed as applied to an aluminum jacketed coaxial cable 2. The cable 2 comprises an outer aluminum jacket 3, an inner copper conductor 4 and a body 6 of dielectric material disposed between the outer conductor 3 and the inner conductor 4. The connector 1 includes an anchoring sleeve 7 adapted to be threaded onto the outer cylindrical conductor 3 of the cable 2 and for this purpose is provided with a helical thread 8 formed on the internal diameter of the cylinder 7. The thread 8 terminates at its left end, as viewed in FIGURE 1, in a short axially-extending portion 9, of approximately the same diameter as the outer diameter of the cable 2, which merges into a section 10 having an outward taper from the end of the section 9 to the left-end of the sleeve 7. The outward taper is gradual so as to prevent breaking or undue weakening of the outer conductor 3 of the cable 2 adjacent the junction of the sections 9 and 10 of the sleeve 7.

A flange 11 which has a peripheral shape of a nut extends axially of the sleeve 7 from the left end thereof, as viewed in FIGURE 1, to a location intermediate the ends of the thread 8. Prior to the threading of the sleeve 7 onto the outer conductor 3 of the cable 2, a nut 12 is slipped over the outer conductor 3 of the cable. The nut 12 is provided with an end wall 13 having an aperture 14 extending through the end wall which is of greater diameter than the sleeve 7 but of lesser diameter than the flange 11. The internal diameter of the nut 12 is greater than the flange 11 and is provided with internal threads 15 which cooperate with external threads 16 on the main body 17 of the connector 1.

The main body of the connector 1 is a generally hollow cylindrical member which in the form illustrated in FIGURE 1 is symmetrical about its transverse center line. The main body portion 18 has located centrally thereof an external transverse surface 19 having the general shape of a nut and is provided adjacent its ends with external threads 16 adapted to cooperate with the threads 15 of the nut 12. The ends of the cylindrical body 18 carrying the threads 16 each terminates in a vertical end face 21 from which extends an inwardly-tapered, axially-extending shoulder 22 having a substantially identical taper to the section 10 and an internal diameter equal to the internal diameter of the body 17. When the main body 17 of the connector 1 is attached to the sleeve 7 by the nut 12 the tapered shoulder 22 is disposed adjacent the region 10 of the sleeve 7 and is adapted to clamp the outwardly-flared portion of the cylindrical conductor 3 between the outer and inner surfaces, respectively, of the tapered portions 22 and 10. Inasmuch as the aluminum sleeve is relatively soft, the aluminum conforms to the shape of these two sections and readily forms a moisture-proof seal between the body 17 and sleeve 7. It will be noted that the dielectric material 6 is removed from the cable internally of the region 10 of the sleeve 7 so as not to interfere with the mating between the tubing 3 and the segments 10 and 22 of the sleeve 7 and main body portions 17, respectively.

Disposed centrally of the cylindrical body 17 of the connector is a hollow pin 23 which is secured within the body 17 by a body of dielectric material 24. The material 24 is confined to a region immediately adjacent the axial center portion of the body and is adapted to cooperate with a recess 25 in the inner wall of the member 18 and a recess 26 in the axial center region of the center pin 23 so as to securely hold and retain the center pin 23 in place. The portion 27 which constitutes the recessed portion of the center pin 23 is solid and forms a bridge between the two identical hollow portions 23′, each adapted to receive the center conductor of distinct lengths of aluminum coaxial cable and therefore to make a junction between the center conductors of two lengths of such cable.

As indicated the central conductor 4 of the coaxial cable 2 extends outwardly from the left end of the sleeve 7, as viewed in FIGURE 1, and is inserted into the distinct hollow portions 23′ of the main body portion 17 of the connector 1. Each of the hollow portions 23′ of center conductor 23 of the connector has a depressed portion 28 which positively engages the center conductor and firmly holds the conductor in place.

Referring in detail now to the novel portions of the connector 1 of the present invention, reference is made to FIGURE 2 of the accompanying drawings, wherein the threads 8 of the sleeve 7 are shown in detail. It will be noted that these threads are rounded and are quite shallow particularly when they are compared with the thickness of the wall of the cylindrical outer conductor 3 of the cable 2. The threads 8 have a depth which if formed as sharp threads would be of insufficient depth to permit the sleeve 7 to be threaded onto the outer conductor 3 of the cable 2. As previously indicated, if these threads were sharp and were of sufficient depth to be able to effect threading of the sleeve 7 onto the conductor 3, they would cut the outer conductor 3 to such an extent as to materially weaken the conductor and permit the cable to pull apart along the cut lines when a pulling force is applied to the cable of considerably less force than required to pull apart the conductor. Further, when sharp threads of sufficient depth to thread the conductor 3 were employed, the inner surface of the conductor 3 was deformed to such an extent as to alter the electrical properties of the cable 2. When the sharp threads were reduced in depth in an effort to reduced the cutting effect on the cable and to prevent interference with the electrical properties thereof, it was found that the threads formed in the conductor 3 were not of sufficient strength to permit the sleeve 7 to be threaded onto the conductor 3. It was found, however, that if threads of the form illustrated in FIGURE 2; that is, rounded and of a mean diameter approximately equal to the diameter of conductor 3, were employed and were of a depth less than that required to produce threading with a sharp thread, not only did the round threads take but the conductor 3 was not weakened and the deformation of the internal surface of the conductor 3 was found to be minimal and of such small amount as not to effect the electrical properties of the cable appreciably. The mean diameter of the threads is approximately equal to the outer conductor 3 so that when the sleeve 7 is threaded thereon, the material displaced by the thread 8 cold flows into the space between the convolutions of the thread 8 subsisting outwardly of the conductor 3. In consequence the metal displaced by the thread 8 constitutes an upper portion of the thread formed in the conductor 3 and strengthens the connection. In a preferred embodiment of the invention the thickness of the wall of the jacket 3 is 0.025 inch and the depth of the thread is only 0.0065 inch, a ratio of wall thickness to thread depth of approximately 3.9 to 1. The range of the ratio of these dimensions is from 3.3 to 1 to 5.6 to 1 although the ratio of 3.9 to 1 has been found to provide greatest strength commensurate with completely satisfactory amounts of tube deformation.

The faces 22 and 10 have a slightly different taper. This insures a tight pinch in the area near 9, which results in a smooth tight, electrically continuous inner metal surface, which reduces electrical losses.

The flare of the cylindrical jacket 3 terminates in a flange rim 20 which is compressed between end face 21 and the abutting end face of the flange 11 to form a weather-tight seal between the main body portion 17 and the sleeve 7 to provide thereby a complete moisture-proof connector.

Another important feature of the connector 1 of the present invention is the structure of the hollow central pin 23, one embodiment of which is illustrated in transverse cross-section in FIGURE 3. Referring specifically to FIGURE 3 of the accompanying drawings, the center conductor 23 is depressed as at 28 along a relatively long axially-extending length of the pin so as to provide a member which is pressed tightly into engagement with the center conductor 4 of the cable. Of specific interest it is a fact that this depressed portion 28 which provides a section extending inwardly of the internal diameter of the pin 23 is formed along a continuous curve with the main body portion so that no areas of weakening exists between the depressed portion 28 and the main body portion.

It has been found that the spring action of the portion 28 thus formed is quite stiff and very long lived so that no appreciable weakening of the spring effect is detected. The important feature of the center pin construction is that no external resilient force is required to effect a tight engagement between the center conductor of the cable and the center pin of the connector. As a result the only dielectric material required in the main body 17 of the connector is that disposed in the axially central region for the purpose of retaining the pin within the cylindrical member 18. In consequence of this arrangement an air dielectric may be employed between the center pin 23 and the cylindrical portion 18 thereby minimizing the ratio of the internal diameter of the body 17 and external diameter of the pin 23 required for impedance matching. The ratio has been found to be sufficiently small that an impedance matching connector has been realized in all but UHF applications.

Another center conductor configuration which may be employed for the center pin 23 is illustrated in FIGURES 4 and 5 of the accompanying drawings and in this embodiment, the pin is cut along two parallel axially-extending lines 29 and 30 to provide a relatively thin axially-extending section 31 which is depressed inwardly of the internal diameter of the pin 23. The portion 31, for the purposes of explanation only, is divided into two end portions 32 and a long central portion 33. The section 33 subsisting between the portions 32 which are shown at an angle thereto for the purposes of explanation only, is work-hardened so that the total length of the two members 32 and the member 33 is greater than its original length and therefore is permanently deformed inwardly of the hollow pin 23 but connected thereto by the still resilient end portions 32 which have not been work-hardened. In consequence, a very strong spring arrangement is provided and a tight connection is achieved between the center conductor of the coaxial cable and the pin 23 and again the pin 23 may be supported in air and does not require a resilient backing material to maintain the tight connection between the center conductor and the hollow pin. The work-hardened section 31 is formed on a single operation by inserting a mandrel in the hollow conductor 23 and utilizing a punch to cut the slots 29 and 30 and depress the strip 31 into engagement with the mandrel.

It can be seen from the above that the coaxial connector of the present invention is quite simple, comprises relatively few parts and may be connected to the cable by merely screwing or threading the sleeve 7 onto the cable. The hollow cylindrical member 17 may carry on the axially-extending half section remote from the cable 2 and an adapter for connection to any other type of cable but is illustrated in FIGURE 1 as being adapted to be connected to a sleeve 7 as provided by the present invention. It is not intended, however, to limit the invention to a member 17 which is symmetrical about its transverse center line since it is apparent that left-hand portions of the body 17 may be adapted to connect to a conventional cable connector.

Another distinctive advantage of the connector of the present invention is the ease with which it may be applied to the cable. Specifically, the steps of application are to remove from the end of the cable 2 a predetermined length of the dielectric 6 and the outer conductor 3 so as to provide an exposed length of inner conductor 4 which later is inserted in the hollow pin 33. The nut 12 is then slid onto the cable 2 in the proper sense and the sleeve 7 is threaded thereon. The dielectric material 6 subsisting within the limits of the region 10 of the sleeve 7 is removed, the outer conductor 3 also subsisting in this region is flared slightly and then the two halves of the connector are brought together and secured to each other by the cooperation of the nut 12 and the threads 20 of the hollow cylindrical main body portion 17. Upon the surface 22 contacting the outer conductor 3 adjacent the section 10, as the nut is tightened, the flaring of this portion of the conductor is completed and a seal is provided between the sleeve 7, the cylindrical tube 3 and the portion 22 of the main body connector.

The simplicity of the connector of the present invention which permits of its ready connection to a cable also permits of the development of a novel tool which may be employed to perform substantially all of the steps required in applying the connector to an aluminum jacketed coaxial cable. Reference is made specifically to FIGURES 6 through 9 of the accompanying drawings which disclose a hollow cylindrical body 35 having approximately the same internal diameter as the external diameter of the cable to which the connector 1 is to be applied. The hollow body 35 is terminated at its right-end as viewed in FIGURE 6 of the accompanying drawings in a screw-threaded portion 36 which is adapted to cooperate with the nut 12 of FIGURE 1 of the accompanying drawings to secure the cable to the right-hand end of the tool in order to perform one of the functions required during application of the connector to the cable. The left-hand end or other end of the hollow cylindrical body 35 is terminated in an enlarged hollow portion 36' having formed on its inner surface 37 a wrench of such a size and shape as to snugly receive the nut-shaped flange 11 on the sleeve 7. A cutter assembly 38 to be described in greater detail subsequently is secured within the hollow tube 35 adjacent the threaded portion 36 of the cylinder and provides a transverse solid wall 39 having a predetermined spacing from a partial transverse slot 40 formed in the upper surface, as viewed in FIGURE 6, of the cylindrical body 35.

A U-shaped member 41 is disposed about the body 35 in transverse alignment with the slot 40 with the yoke of the U-shaped portion diametrically opposed to the slot. Vertical arms 42 and 43 of the U-shaped member 41 extends a predetermined distance above the upper surface of the cylindrical member 35, that is, above the surface having the slot 40 formed therein. Disposed between the legs 42 and 43 is a block 44 which is provided with vertically-extending slots 45 and 46 formed in its vertical edges so that the block 44 may slide along the inner edges of the uprights 42 and 43 of the U-shaped member 41. Thus, the block 44 may slide toward and away from the body 35 being guided and retained in place by the legs 42 and 43.

Disposed across the top of and secured to the legs 42 and 43 above the block 44 is a cross member 47. The member 47 is provided with a centrally-disposed vertical threaded aperture 48 through which extends a machine screw 49 secured in ball and socket fashion to the block 44 at the location designated by the reference numeral 50. The ball and socket connection 50 of the screw 49 to the block 44 permits the screw to rotate freely in the block while constraining the block to move vertically with vertical movement with the screw 49. The upper end of the screw is provided with a knob 51 secured thereto by a set screw 52. Thus, as the knob 51 is rotated the screw due to its engagement with the threaded aperture 48 in the block 47 is translated vertically and imparts vertical movement to the block 44.

The block 44 is provided with a dome-shaped recess 53 in the face adjacent the wrench end 36' of the cylindrical member 35. The block 44 is recessed to such a depth that a back wall 54 of the recess is vertically aligned with the vertical side of the recess 40 in the body 35. Disposed within the recessed portion of the block 44 is a cutter blade 55 which is rotatably supported on a screw 56 threaded into the wall 54 of the block 34. As indicated the blade 55 is rotatable about the screw 56 and since it is secured to the block 44 is vertically reciprocatable with the block. The vertical travel of the block 44 is such that the bottom edge of the blade 55 at its lower limit of movement is brought to within a small fraction of an inch of the center conductor of a cable inserted in the hollow body 35 from the wrench end. The blade 55 is provided with a flat surface immediately adjacent the wall 54 of the block 44 and is provided with a tapered surface which faces the threaded end 36 of the hollow body 35.

In operation, when it is desired to attach the connector of the present invention to an aluminum jacketed coaxial cable, the cable is inserted into the hollow body 35 through the large wrench end 36 and is brought into abutting relation with the wall 39 which as previously stated is at a fixed predetermined distance from the recess 40. The thumb screw is rotated until the bottom edge of the blade 55 is pressed firmly into the outer jacket or tubing 3 of the coaxial cable and then the tool is rotated so as to cut a groove in the jacket. The thumb screw is then rotated to advance the blade into the aluminum jacket and the tool again rotated. This procedure is continued until the aluminum outer conductor is completely severed and until almost the entire dielectric material which subsists between the outer jacket and the inner conductor is cut, leaving only a relatively small cylindrical core of dielectric material between the bottom of the cutting blade and the center conductor. The cutting blade is then withdrawn from the cable, and the cable withdrawn from the tool. A pair of pliers may then be employed to twist off the almost severed portion of the cable.

The utilization of a blade having a flat surface adjacent the dielectric of the main body of the cable has been found to substantially eliminate any problem which might otherwise arise as a result of aluminum particles cut from the outer shield becoming imbedded in the dielectric disposed between the outer conductor and the center conductor. It is apparent, of course, that if this aluminum became permanently imbedded in the dielectric the electrical properties of cable would be impaired. Although as will appear subsequently this portion of the dielectric immediately adjacent the cut is subsequently removed, there is still the possibility that some of the material may still be imbedded in the dielectric if the initial amount of metal in the dielectric is large. By insuring initially that substantially no aluminum shavings or particles are imbedded in the dielectric the possibility that after this portion of the dielectric is removed, the possibility that any aluminum will still be present in rendered completely remote.

After a predetermined length of material has been removed to form the main body of the cable the nut end of the sleeve 7 is disposed within the wrench portion 36'—37 of the tool and the sleeve slid onto the end of the cable until the threads 8 are in abutting relation with the end of the outer metal jacket of the cable. The tool may then be employed as a wrench with the U-shaped member and its associated parts acting as a handle for the wrench. The wrench is rotated until the end of the aluminum jacket is positioned adjacent the flanged end of the sleeve 7.

The next step in the application of the connector to the cable is to remove the dielectric adjacent the section 10 of the sleeve 7 and at the same time to partially flare the jacket 3 outwardly adjacent the section 10 of the sleeve 7. This may be accomplished by the cutting end of the tool which comprises the cutter body 38 having an axially extending central bore 58 for receiving the center conductor of the cable after the end portion has been removed and the sleeve has been applied. The vertical end surface of the cutter body 38 has an initially radially extending annular shoulder 59 which terminates in an inwardly tapered portion 60 which has a slightly smaller taper than the section 10 of the sleeve 7 so that when this portion is pressed against the inner surface of the outer aluminum jacket 3 of the cable 2, the jacket is not pressed tightly or deformed completely into engagement with the section 10 of the sleeve 7. The tapered portion 60 of the cutter end terminates in two diametrically opposed cutting members 61, 62 which have opposite slopes with respect to a plane drawn perpendicular to the axial center line of the cutter. These two cutting members 61 and 62 are separated by deeply recessed portions 63 and 64 which are curvilinear adjacent the leading edges of the cutters and are adapted to receive the material which is cut from the cable.

In order to employ the cutting end 38 of the tool, the dielectric of the end of the cable to which the sleeve 7 has been secured is brought into engagement with the cutting edges of the members 61, 62 and the nut 12 is threaded onto the threaded portion 36 of the tool body 35. The nut is tightened somewhat, the tool is rotated and this process is continued until the flared portion of the end wall of the flange 11 of the sleeve 7 abuts the shoulder 59 of the cutting end 38 of the tool. At this point all of the dielectric material has been removed from the end segment 10 of the sleeve 7 and the cable jacket 3 has been flared almost but not quite into engagement with the surface of the segment 10, as indicated by the reference numeral 63. Thereafter, the main body of the connector may be secured to the sleeve 7 by the nut 12 and the surface 22 of the main body 18 completes the flare of the tube 3 into engagement with the segment 10 of the sleeve 7.

It can be seen from above that the single tool illustrated in FIGURES 6 through 9 may be employed to perform substantially all of the operations required for attaching the connector of the present invention to an aluminum jacketed coaxial cable. The tool is employed to remove an end segment of the cable to provide the short exposed length of center conductor which is adapted to be inserted in the hollow cylindrical member 23 of the main body of the connector, is employed to thread the sleeve 7 onto the aluminum jacket and is employed to produce the initial flare of the jacket and remove the dielectric material from adjacent the flared portion. The only tools that are required in addition to those disclosed are a pair of pliers for twisting off the end of the cable to be removed and a couple of wrenches for tightening the nut 12 onto the body portion 18.

It will be noted that extreme simplicity and utility of the tool is accomplished by the interaction of the various elements thereof. Specifically, the rear wall of the cutter body 36 is employed during the jacket removal operation since it provides an end support and spacing member for the cable, the U-shaped member 41 is employed during the operation of threading the sleeve 7 onto the jacket 3 since it serves as the handle for the wrench 36'—37 and the U-shaped member 41 serves as a handle for holding the body when applying the nut 12 to the threads 36.

The only type of aluminum jacketed coaxial cable thus far described is that having a solid dielectric disposed between the aluminum jacket and the center conductor. Other types of aluminum jacketed cables are available and in particular there is provided an aluminum jacketed cable having a dielectric material in the form of a helix. It has been found that in such a cable the cutting members 61, 62 should be dispensed with and the dielectric material removed from adjacent the section 10 of the sleeve 7 by means of a knife or similar instrument. The cutting end 38 then merely becomes a tool for producing the initial flare of the aluminum jacket adjacent the section 10 of the sleeve 7.

The connector of the present invention has been disclosed as applied to aluminum jacketed coaxial cables but it is not intended to limit the connector aluminum jacketed or coaxial cables only. Specifically, the connector of the invention may be applied to any malleable metal jacketed coaxial cable and in its broadest aspects the concept of the rounded threads on the sleeve 7 may be applied in any instance in which a joint or connector is to be provided between two hollow pipes fabricated from relatively soft and malleable metal such as aluminum or copper pipes. Thus, the concept of the utilization of shallow rounded threads for threading a sleeve onto a hollow malleable member is not restricted to the electrical arts but may be applied to other fields in which hollow malleable metal tubing is employed.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. An electrical cable comprising an inner elongated metallic conductor, an outer elongated conductor having a solid tubular form and being of a malleable metal circumscribing said inner conductor, dielectric support material disposed within said tubular outer conductor and supporting said inner conductor within said outer conductor, an anchoring sleeve having a helical thread defined on the interior surface thereof and being telescopically threaded over the exterior surface portion of said outer conductor adjacent an end of said cable, said threads being rounded in surface contour, said portion of said outer conductor having a mating helical track embossed therein by the threaded application of said sleeve thereto and including a helical ridge between the convolutions of said track formed by the flow of metal from said outer conductor in the formation of said helical track, said ridge substantially filling the helical recess between the convolutions of the helical thread on said sleeve, electrical connector means for making electrical connections with said inner and outer conductors, and means carried by said sleeve for mechanically coupling said end of said cable to said connector means and for retaining said connector means in electrical contact with said conductors.

2. In an electrical cable as set forth in claim 1, the end of said sleeve immediately adjacent said end of said cable having an internal flare and a portion of said connector means having a substantially mating taper, whereby the end of said outer conductor is clamped between said flare and taper when said connector means is coupled to said end of said cable by said coupling means.

3. In an electrical cable as set forth in claim 2, said sleeve having an external flange, said connector means having an external thread, and said coupling means being an internally shouldered threaded nut for engaging said external flange and external thread.

4. In an electrical cable as set forth in claim 1, said electrical connector means comprising an elongated socket for receiving an end portion of said inner conductor, said socket having an elongated inwardly directed detent portion having a cross-sectional configuration providing a continuous smooth curvature with the remaining socket wall.

5. In an electrical cable as set forth in claim 1, said electrical connector means comprising an elongated socket for receiving an end portion of said inner conductor, said socket having an elongated inwardly directed detent portion formed by two parallel cuts in the socket wall, a major central portion of said detent being work hardened.

6. An electrical cable comprising an inner elongated metallic conductor, an outer elongated conductor having a solid tubular form and being of a malleable metal circumscribing said inner conductor, dielectric support material disposed within said tubular outer conductor and supporting said inner conductor within said outer conductor, an anchoring sleeve including means defining a helical thread on the interior surface thereof and being telescopically threaded over the exterior surface portion of said outer conductor adjacent an end of said cable, said threads being rounded in surface contour, said portion of said outer conductor having a mating helical track embossed therein by the threaded application of said sleeve thereto and including a helical ridge between the convolutions of said track formed by the flow of metal from said outer conductor in the formation of said helical track, means for making electrical connections with said inner and outer conductors, and means carried by said sleeve for mechanically coupling said end of said cable to said connector means and for retaining said connector means in electrical contact with said conductors.

7. In an electrical cable as set forth in claim 6, said electrical connector means comprising an elongated socket for receiving an end portion of said inner conductor, said socket having an elongated inwardly directed detent portion having a cross-sectional configuration providing a continuous smooth curvature with the remaining socket wall.

8. In an electrical cable as set forth in claim 6, said electrical connector means comprising an elongated socket for receiving an end portion of said inner conductor, said socket having an elongated inwardly directed detent portion formed by two parallel cuts in the socket wall, a major central portion of said detent being work hardened.

References Cited in the file of this patent

UNITED STATES PATENTS

| | | |
|---|---|---|
| 2,128,132 | Frederick | Aug. 23, 1938 |
| 2,181,860 | Adkinson | Dec. 5, 1939 |
| 2,359,846 | Hayman | Oct. 10, 1944 |
| 2,449,983 | De Vol | Sept. 28, 1948 |
| 2,544,058 | Watkins | Mar. 6, 1951 |
| 2,575,779 | Young | Nov. 20, 1951 |
| 2,615,953 | Waite | Oct. 28, 1952 |
| 2,673,233 | Salisbury | Mar. 23, 1954 |
| 2,894,240 | Mautner | July 7, 1959 |